United States Patent [19]
Leonard et al.

[11] 3,723,817
[45] Mar. 27, 1973

[54] VEHICLE BATTERY CHARGING SYSTEMS

[75] Inventors: Gordon Harris Leonard, Chalfont St. Peters, Bucks; Zycmunt Sobecki, North Greenford, Middlesex; Peter Robert Lomas, London, all of England

[73] Assignee: C. A. V. Limited, Birmingham, England

[22] Filed: Sept. 1, 1971

[21] Appl. No.: 177,014

[30] Foreign Application Priority Data

Sept. 4, 1970  Great Britain..................42,428/70

[52] U.S. Cl..............317/31, 317/33 R, 317/50, 320/40, 322/28
[51] Int. Cl.................................................H02h 3/20
[58] Field of Search ........320/40; 322/28; 317/31, 50, 317/33 R

[56] References Cited

UNITED STATES PATENTS

| 3,571,657 | 3/1971 | Domann | 322/28 X |
| 3,581,150 | 5/1971 | Kirk | 322/28 X |
| 3,321,692 | 5/1967 | Walsh | 320/40 |
| 3,389,324 | 6/1968 | Ballman | 320/40 X |
| 3,597,673 | 8/1971 | Burkett et al. | 320/40 X |

Primary Examiner—James D. Trammell
Attorney—Holman & Stern

[57] ABSTRACT

A vehicle battery charging system includes an alternator having an exciting winding and a voltage regulator which includes a transistor connected in series with the exciting winding to control the current flow therein. In the event of a voltage surge a Zener diode breaks down and causes the transistor to conduct thereby placing the transistor in a better state to withstand the voltage surge.

4 Claims, 1 Drawing Figure

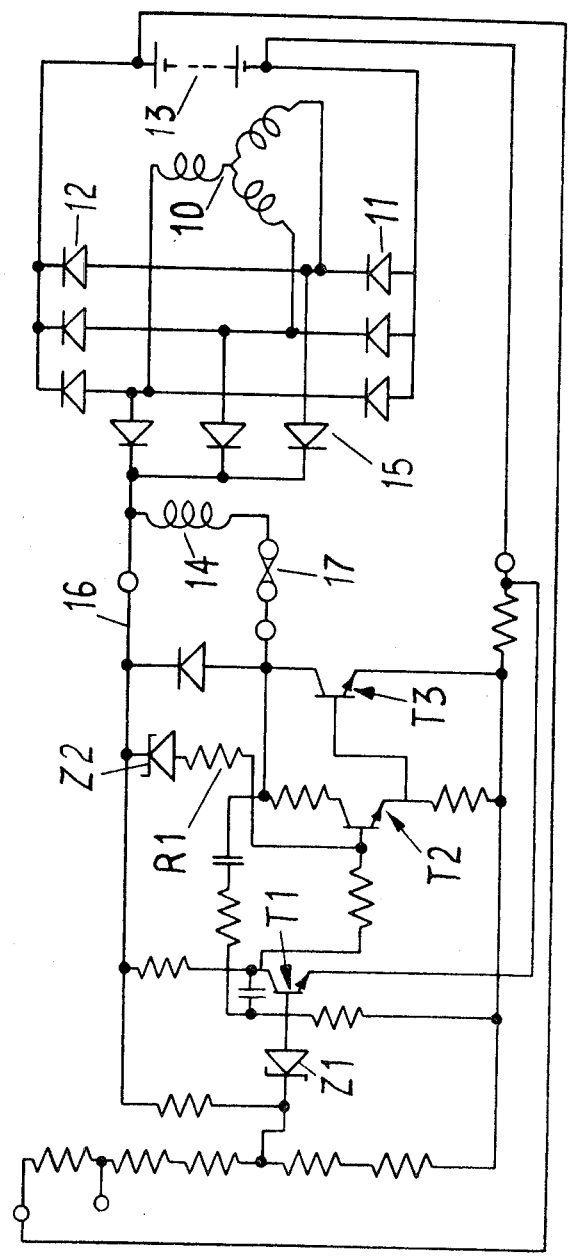
Gordon Harris Leonard, Zygmunt Sobecki, and Peter Robert Lomas

VEHICLE BATTERY CHARGING SYSTEMS

This invention relates to vehicle battery charging systems of the kind comprising in combination an alternator having an exciting winding, the output of the alternator being fed to the battery by way of a rectifier unit, a voltage regulator for controlling the flow of current through the exciting winding thereby to control the output of the alternator, the voltage regulator including at least one transistor in circuit with the exciting winding and which is switched on and off to control the current flow in the exciting winding.

With such a system it is not uncommon for high voltage surges to occur and for the high voltage surges to be applied to the transistor. The surge will have little damaging effect on the transistor providing the latter is switched on however, should the transistor be turned off the surge could damage the transistor.

The object of the invention is to provide a system of the kind specified in a simple and convenient form and in which the risk of damage to the transistor is minimized.

According to the invention in a system of the kind specified voltage sensitive means is provided which in the event of a voltage surge appearing automatically switches said transistor on.

One example of a system in accordance with the invention will now be described with reference to the accompanying drawing in which there is shown an alternator having output windings 10 which through a rectifier unit having two sets of rectifiers 11, 12, supply current to a battery 13.

The alternator also includes an exciting winding 14 which is supplied with current by a further set of rectifiers 15 and the set of rectifiers 11. For controlling the flow of current through the exciting winding there is provided a voltage regulator which includes transistor T1, T2 and T3. Transistor T3 carries the main current flowing in the exciting winding and the arrangement is such that when transistor T1 is turned off transistors T2 and T3 will be turned on. Zener diode Z1 acts to sense the voltage across the battery and when this exceeds a predetermined value the zener diode will contact and will thereby maintain transistor T1 in a conducting state and transistors T2 and T3 will be turned off thereby preventing current flow through the exciting winding. In practice transistor T1 and transistors T2 and T3 will switch on and off, the mean current flow in the exciting winding being adjusted to provide the desired state of change of the battery.

In the event of a high voltage surge being developed at the alternator output terminals whilst transistor T2 and T3 are turned off the two transistors could be damaged and in order to avoid this there is provided a voltage sensitive circuit which comprises a zener diode Z2 and a resistor R1 connected in series. These components are connected between the base terminal of transistor T2 and the positive supply rail 16. The breakdown voltage of the Zener diode Z2 is higher than that of zener diode Z1 and the arrangement is such that if a voltage surge occurs zener diode Z2 will conduct and transistor T2 will be switched on and this in turn will switch transistor T3 on. Thus all the transistors will be switched on and will therefore be better able to withstand the voltage surge.

It will be understood that other forms of voltage sensitive circuit can be used in place of the zener diode and the resistor.

A fuse link 17 is provided to limit the current which can flow through the field winding 14 and the transistors T2 and T3 in the event of a prolonged high voltage surge.

We claim:

1. A vehicle battery charging system comprising in combination an alternator, a rectifier unit through which the output of the alternator is supplied to the vehicle battery, an exciting winding for the alternator, a voltage regulator for controlling the flow of current through the exciting winding to control the output of the alternator, at least one transistor forming part of said voltage regulator and in circuit with the exciting winding, said transistor being switched on and off to control the current flow in the exciting winding, and voltage sensitive means which in the event of a voltage surge appearing automatically switches said transistor on.

2. A system as claimed in claim 1 in which the voltage sensitive means in the event of a surge developing effects an increase in the base current on said transistor thereby to turn said transistor on.

3. A system as claimed in claim 2 in which said voltage sensitive means includes a zener diode.

4. A system as claimed in claim 3 including a fuse link in circuit with the exciting winding.

* * * * *